US006824917B2

United States Patent
Aaltonen et al.

(10) Patent No.: US 6,824,917 B2
(45) Date of Patent: Nov. 30, 2004

(54) BATTERY SYSTEM FOR A PORTABLE ELECTRONIC DEVICE

(75) Inventors: Markus Aaltonen, Littoinen (FI); Mika Kanninen, Piikkio (FI); Matti Naskali, Tokyo (JP)

(73) Assignee: Nokia Corporation, Espoo (FI)

( * ) Notice: Subject to any disclaimer, the term of this patent is extended or adjusted under 35 U.S.C. 154(b) by 492 days.

(21) Appl. No.: 10/013,793

(22) Filed: Dec. 11, 2001

(65) Prior Publication Data

US 2003/0108786 A1 Jun. 12, 2003

(51) Int. Cl.[7] .................. H01M 2/10; H01M 14/100; H01M 2/02; H01M 2/12
(52) U.S. Cl. .................... 429/97; 429/7; 429/100; 429/170; 429/171; 429/56
(58) Field of Search ................. 429/7, 96, 97, 429/99, 100, 170, 171, 172, 56

(56) References Cited

U.S. PATENT DOCUMENTS 5,716,730 A * 2/1998 Deguchi ................. 429/97
6,432,575 B1 * 8/2002 Yamagami ............. 429/100
6,579,640 B1 * 6/2003 Nagase et al. ............ 429/54

* cited by examiner

Primary Examiner—Patrick Ryan
Assistant Examiner—Thomas H. Parsons
(74) Attorney, Agent, or Firm—Ware, Fressola, Van Der Sluys & Adolphson LLP

(57) ABSTRACT

A battery system for a portable electronic device includes a thin wall can structure for holding cathode and anode material and electrolyte defining a battery cell. Current is limited by a safety component integral with a cap assembly that seals the can structure and provides electrical and mechanical connection with a related battery pack engagement and holding arrangement which maintains the battery pack in an operative position in the electronic device. A finger groove is used to lift the battery pack from its operative position. A weakened wall in the finger groove functions as a safety vent and ruptures to release built-up pressure to prevent the battery pack from exploding.

17 Claims, 7 Drawing Sheets

BATTERY SYSTEM FOR A PORTABLE ELECTRONIC DEVICE

BACKGROUND OF THE INVENTION

The present invention relates generally to the field of batteries and deals more specifically with a battery system, and more particularly with a battery pack and a related battery pack engagement and holding arrangement for portable handheld and mobile electronic devices such as a mobile cellular telephone.

Consumers continue to demand that mobile electronic devices such as mobile cellular telephones be lighter, smaller and thinner and to provide additional communication features and capabilities. In order to meet the demands of consumers, higher capacity and increased energy density rechargeable batteries are required. Although great advances have been made in battery technology to increase energy density such as, for example, lithium ion, within a given available space, a number of factors related to the battery pack construction and form and the electronic circuitry required to utilize such battery packs imposes limits on the energy density attainable within the given space. Typically, a mobile phone battery pack includes an individual battery cell that provides the electrical power via lead plates or wires or conductors that are used to connect the cell to a protection circuit and/or a protection device. The protection circuit functions to protect not only the user, but also the battery cell and the mobile phone from damage in the event of misuse or a malfunction.

The protection circuits inside the battery pack function to prevent or limit over-voltage charging, under-voltage discharging, high discharge currents and high charge currents and/or high temperature operating conditions. These additional and typically separate protective functions are necessary because the battery cell, such as a lithium ion battery cell, cannot by itself provide these functional safety requirements without the protection circuits. Generally, the protection circuit electronic components are mounted on a printed circuit board of some type which is also contained within the battery pack. Additionally, plastics or foils may be used to provide mechanical durability and to prevent electrical shorts between the cell and other components of the battery pack including the battery pack itself.

The requirement for such protection circuitry and other protective devices within the battery pack adds to the cost of the mobile cellular telephone battery pack and it is estimated that 50% of a battery pack cost is other than the battery cell itself. Additionally, the space requirements for such protection circuitry and devices consumes space which might otherwise be available to the battery cell to increase within a given space the energy density of the battery pack used with the mobile cellular telephone.

There is a need therefore to provide a battery pack for use with a mobile cellular telephone that provides increased energy density by accommodating a larger battery cell within a given space and in which protection devices are not contained within the battery pack to maximize volume for the battery cell. There is also a need for a related battery pack engagement and holding arrangement for use with the mobile telephone that facilitates easy insertion and removal of the battery pack. The present invention satisfies these needs, as well as others, and generally overcomes the problems and deficiencies associated with known preformed and molded battery packs used with mobile telephones.

SUMMARY OF THE INVENTION

An object of the present invention is to provide a battery pack and a related battery pack engagement and holding arrangement for use in a mobile cellular telephone.

Another object of the invention is to locate a battery cell protective device exterior of the interior portion of the battery pack structure carrying the battery cell.

A further object of the invention is to provide a battery pack engagement and holding arrangement for use with the mobile cellular telephone in which the battery pack is easily inserted and removed from the mobile cellular telephone.

A yet further object of the invention is to provide a battery pack for use with a mobile cellular telephone that includes a weaken wall area to relieve excessive pressure build-up within the battery pack.

In accordance with the invention, a battery system for use in a portable electronic device is presented. A shallow profile, axially elongated thin wall can structure having a width, height, axial length and shape corresponding generally to the width, height, axial length and shape, respectively of the battery package receiving and holding region of the electronic device. The can structure has an opening at one end for receiving and holding anode and cathode material and electrolyte defining a battery cell. A safety component is electrically coupled between one of the anode or cathode means and a first voltage potential output contact means. The other of the anode and cathode means is electrically coupled to a second voltage potential output contact means. The safety component is carried by insulating means having a size and shape corresponding to the opening of the can structure to cover the opening. A cap has an outer peripheral surface size and shape corresponding to the size and shape of the can structure at one end and is coextensive with the outer surface of the can structure for sealing the opening. The cap has an outwardly extending flange region for engagement with holding means located at one end portion of the battery package receiving and holding region of the electronic device when the battery package is in its operative position within the device. Means for releasing the battery package from its operative position within the device is formed in the outer wall of the can structure at the end opposite the opening.

Preferably, the insulating means further comprises a first insulating plate and a second insulating plate in a facing relationship with one another to sandwich the safety component therebetween.

Preferably, the cap is attached and held the to the first insulating plate.

Preferably, a rivet has a head and body wherein the body passes through one end of the safety component, through the first insulating plate and through the cap to hold the safety component, first insulating plate and the cap together.

Preferably, the rivet body and head are hollow and define a conduit between the end located at the cap and the head located adjacent the second insulating plate. The second insulating plate has an aperture therethrough and in alignment with and communication with the rivet head for carrying electrolyte from the rivet end through the rivet body and the rivet head into the interior of the can structure and into contact with the anode and cathode material.

Preferably, means seal the rivet body end to prevent electrolyte from escaping from the battery package.

Preferably, an electrically non-conductive coating is applied to the exterior surface of the battery package.

Preferably, the non-conductive coating further comprises a sleeve for covering the surface of the battery pack.

Preferably, the releasing means further comprises a finger groove in the outer surface of the end wall.

Preferably, the wall thickness of the finger groove is selected to rupture upon pressure build-up inside the battery package to prevent the battery package from exploding.

DETAILED DESCRIPTION OF PREFERRED EMBODIMENTS

Figure 1:
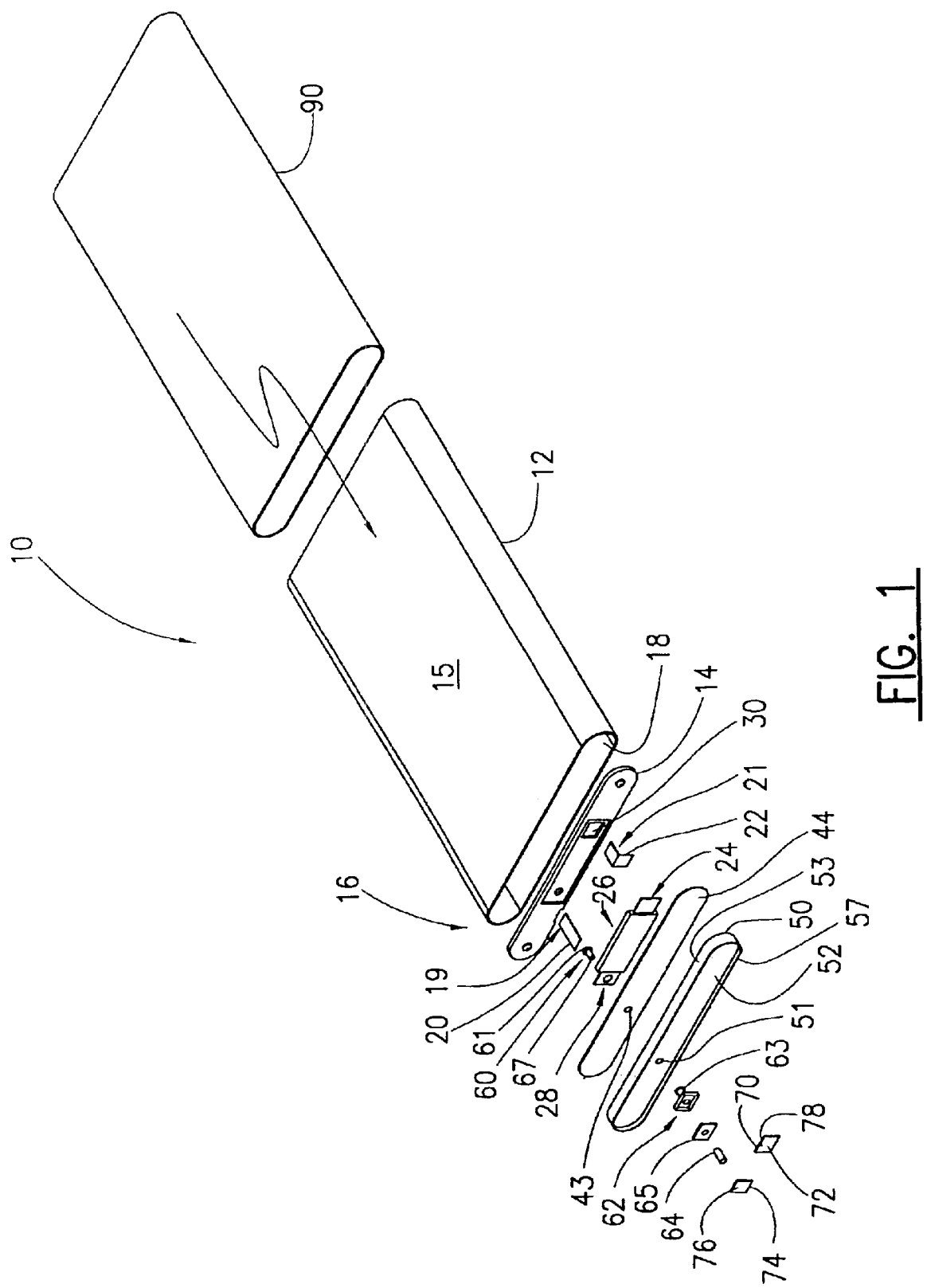
FIGS. 1 and 2 are exploded views of the battery pack of the battery system embodying the present invention.
Figure 2:
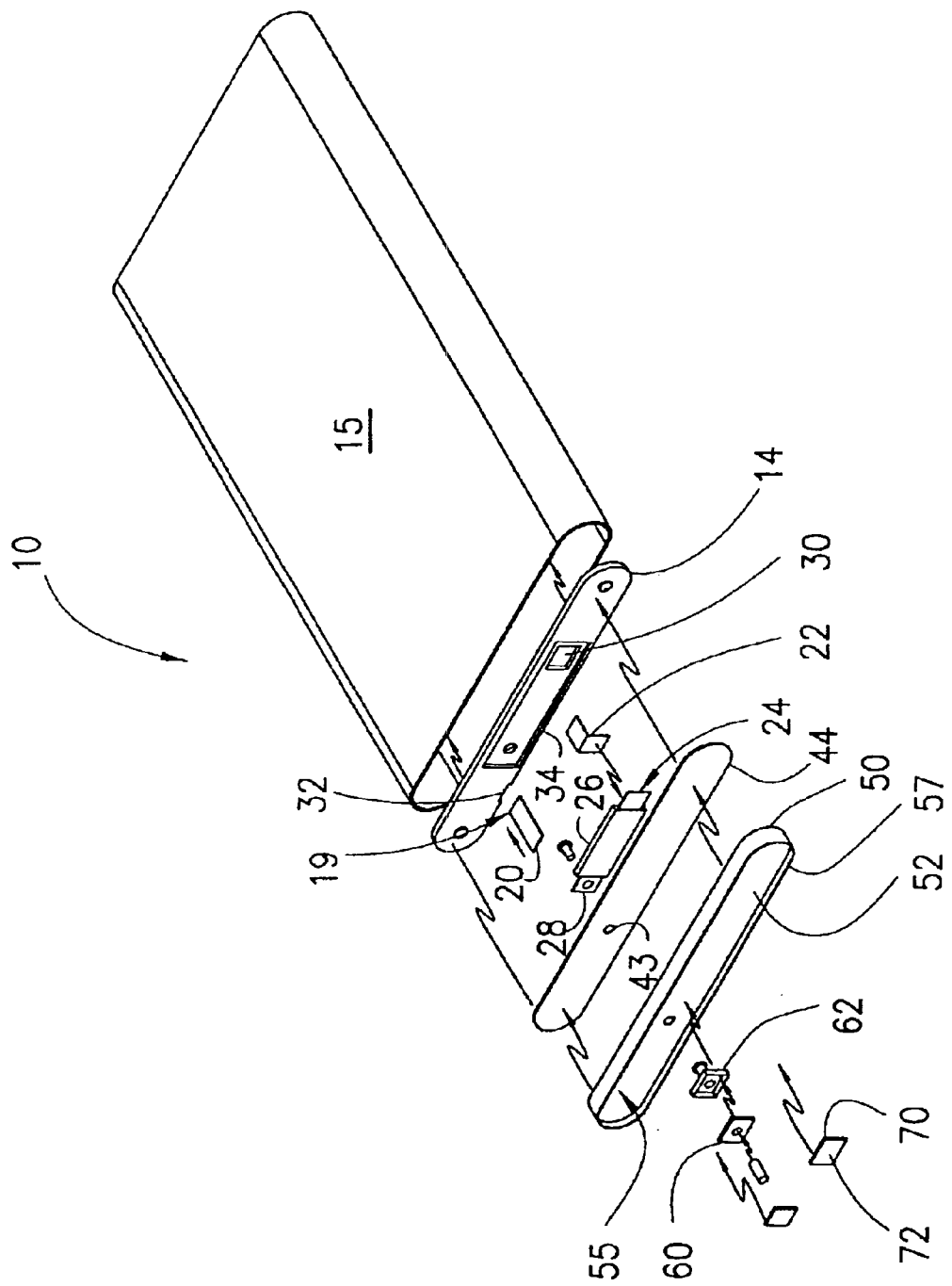

Turning now to the drawings and considering the battery system of the present invention in further detail, an exploded view of the battery pack of the battery system is illustrated in FIGS. 1 and 2 and generally designated 10. The battery pack 10 includes a shallow profile, axially elongated thin wall can structure generally designated 12. Preferably, the can structure 12 is formed as a deep drawn aluminum cup or holder having width, height, axial length dimensions and shape corresponding generally to the width, height, axial length and shape respectively of the area of the electronic device which holds the battery pack in its operative position. The can structure 12 has an opening 18 at one end region 16 for receiving and holding anode and cathode material and electrolyte defining a battery cell. The anode, cathode and electrolyte marterials depend on the chemistry of the battery cell utilized and are defined by the battery cell manufacturer. It is contemplated that the battery cell be of a high energy density chemistry now known or future developed to carry out the intended function of the battery system of the present invention. Preferably, the battery cell is a flat battery cell and of a lithium technology and chemistry such as, lithium-ion although other battery chemistries may also be employed.

Figure 5:
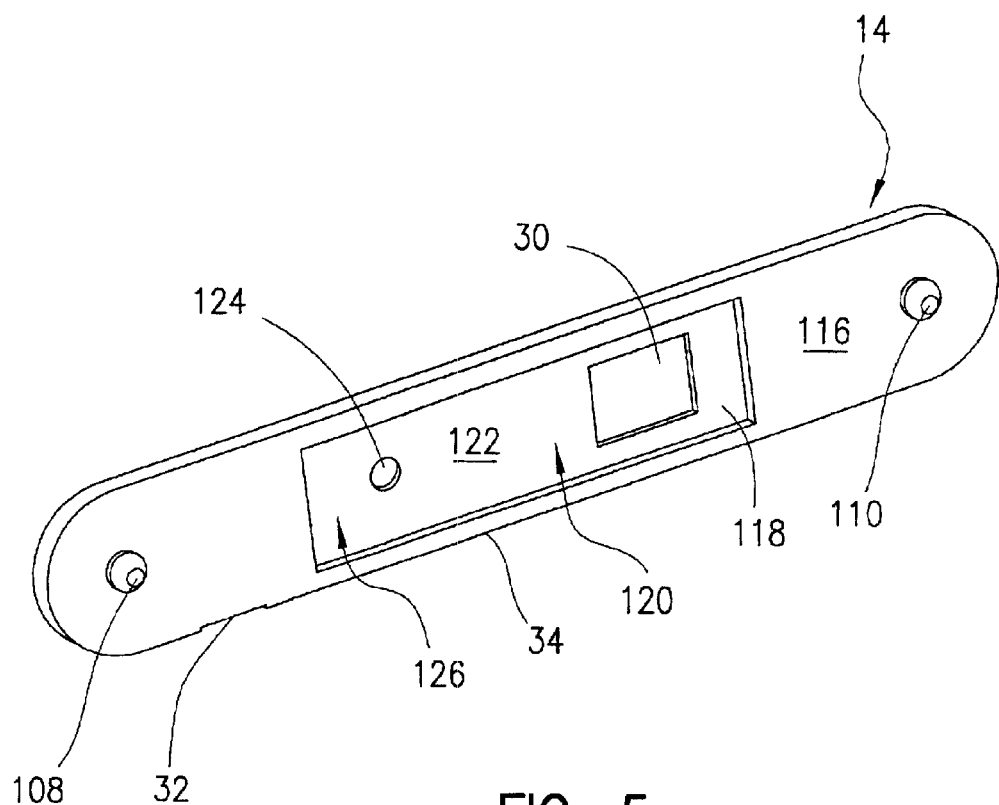
FIG. 5 is a perspective view of the outwardly facing side of the innermost insulation plate.

An insulation plate 14, also illustrated in FIG. 5, is located nearest and innermost to the open end region 16 of the can structure 12 and covers the opening 18 of the can structure. A lead 20 preferably made of a thin nickel strip material or other suitable thin conductive material is attached to the positive electrode of the battery cell during the fabrication of the electrode assembly of the battery cell. A lead 22 is attached to the negative electrode of the battery cell during the fabrication of the electrode assembly of the battery cell and is coupled to one end 24 of the safety component generally designated 26. The insulation plate 14 functions to not only cover the opening 18 of the can structure 12 but also to insulate the negative voltage potential lead 22 from the can structure 12 and from the positive voltage potential lead 20. A tab end portion 21 of the negative voltage potential lead 22 extends through an aperture or opening 30 through the insulation plate 14 and is attached to the negative electrode of the battery cell. A tab end portion 19 of the positive voltage potential lead 20 passes through a groove or indent 32 formed in one edge 34 of the insulation plate 14 and is attached to the positive electrode of the battery cell.

Figure 3:
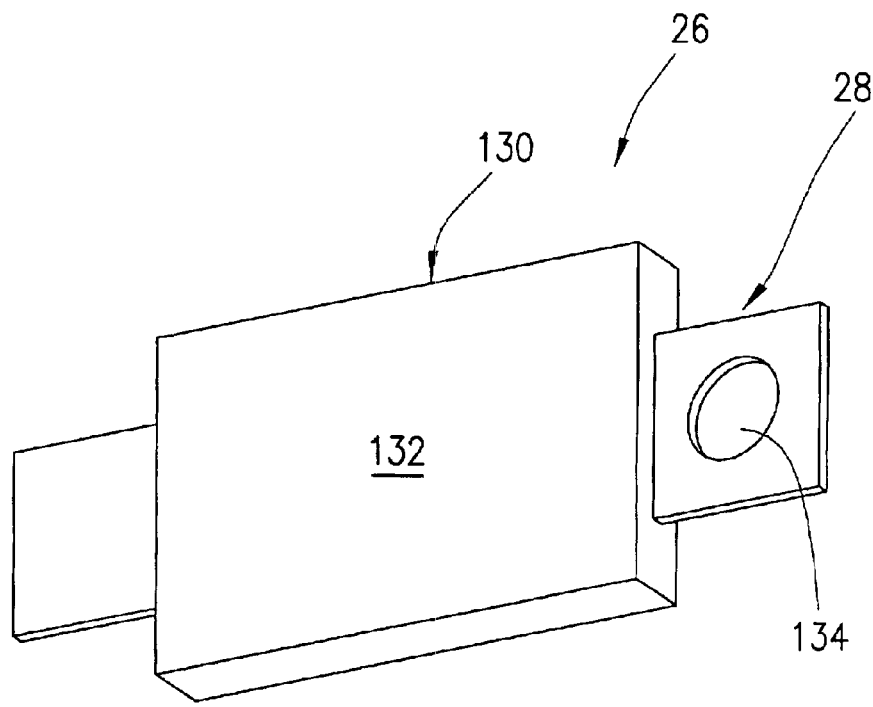
FIG. 3 is a perspective view of the safety component used in the battery pack of the present invention.
Figure 4:
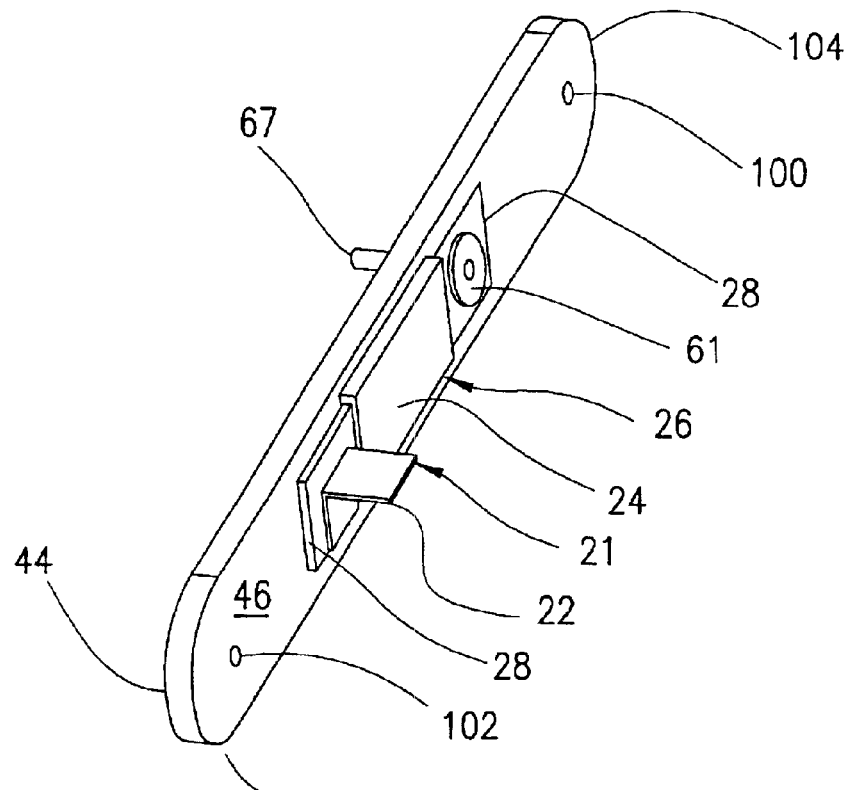
FIG. 4 is a perspective view of the inwardly facing side of the outermost insulation plate showing the location of the safety component and one terminal used to connect to one polarity of the battery cell.

The safety component 26 as illustrated in FIG. 3 is located and sandwiched between the insulation plate 14 and a second insulation plate 44 also illustrated in FIG. 4. Preferably, the safety component 26 is a bi-metal circuit breaker, fuse, positive temperature coefficient resistor (PTC) or other temperature and current sensing device that responds to electrical short circuits, high currents or high temperatures. The safey component 26 responds to such conditions by increasing its ohmic resistance to limit the electrical current in its path to protect the battery cell from damage and to protect the electrical components of the electronic device powered by the battery pack. Safety devices for such current limiting uses are well known to those skilled in the art. The safety component 26 includes a rectangular box-like shaped body 130 with two oppositely disposed axial leads 24, 28 extending from the body 130. Although shown as a rectangularly shaped device, the PTC resistor can be of any other shape as well to carry out the intended function.

Referring to FIG. 5, the insulation plate 14 includes a recess cheek portion 120 having substantially a size and shape to nest the body 130 of the safety component 26 with the major surface 132 of the body 130 in facing relation to the surface 122 of the recess portion 120. The insulation plate 14 includes an aperture or opening 124 near the end region 126 of the recess portion 120 and is located in alignment with the opening 134 in the lead end 28 of the safety component 26 and aperture or opening 43 in the insulation plate 44 when the safety component 26, insulation plate 44 and insulation plate 14 are assembled together. The insulation plate 14 also has an aperture or opening 30 near the end region 118 of the recess portion 120 through which the tab end 21 of the negative voltage potential lead 22 passes to connect to the negative electrode of the lithium-ion battery cell within the can structure 12 when the battery pack is assembled. The insulation plate 44 also provides mechanical support for the safety component 26 and includes a recess portion in the inwardly facing side 46 to nest the body 130 of the safety component with the major surface 134 of the body 130 in facing relation to the recess portion in the side 46 when the safety component is assembled with the insulation plate 44. The insulation plate 44 includes countersunk holes 100, 102 at each end region 104, 106 respectively to align and receive bosses 108, 110, respectively, projecting from the outwardly facing side 116 of the insulation plate 14 to align the insulation plate 44 and insulation plate 14 when they are joined together to sandwich the safety component 26.

The insulation plates 14 and 44 are preferably made of a plastic material such as polyethylene or other insulative material well known to those skilled in the art. The insulation plate 14 insulates the negative voltage potential lead 22 from the can structure 12 and also from the positive voltage potential lead 20. The insulation plate 44 is likewise of a plastic material such as polyethylene or other insulative material well known to those skilled in the art. The insulation plate 44 insulates the negative voltage potential lead 22 from the can structure 12 and the cap 50 and the positive voltage potential lead 20 when the battery pack is assembled.

An aluminum cap or collar 50 has a peripheral size and shape similar to the peripheral size and shape of the insulation plates 44 and 14, and when the cap is attached to the can structure 12, the outer peripheral surface 53 becomes coextensive with the outer peripheral surface 15 of the can structure 12. The cap 50 includes an outwardly facing recessed portion 55 defined by a peripheral flange 57 and face surface 52. Once the assembly is completed, the cap 50 and can structure 12 are joined along the interface seam formed between the cap and the can structure by laser welding, electron beam welding, TIG welding or other means well known to those skilled in the welding art.

The assembly of the insulation plates 14 and 44, cap 50 and safety component 26 is held together by together a rivet 60 having a head 61 and body 67. The lead end of the safety component and rivet could also be welded together, but the hole in the lead of safety component is still needed to pass the rivet body. A rivet insulator 62 includes a hollow shaft-like protrusion 63 which passes through the opening 51 in the face 52 of the recessed portion 55 to insulate the body portion 67 of the rivet 60 from the cap 50. The rivet insulator 62 is made of a plastic material such as a polyethylene or other electrically insulative material well known to those skilled in the art. The body 67 of the rivet 60 passes in an outwardly direction through the opening 134 in the lead 28 of the safety component 26, through the opening 43 in the insulation plate 44, through the cap 50 and rivet insulator 62 and through the rivet backer 65. The rivet body end is expanded in the normal manner to fasten the assembly together. The rivet backer 65 functions as a connection base for a negative voltage polarity pad 70 which has a surface 72 for contact with the corresponding negative voltage potential terminal of the mobile cellular telephone.

Once assembled, electrolyte is added to the battery cell, such as a lithium-ion battery cell, by injecting electrolyte through the body 67 which functions as a conduit along the longitudinal length of the rivet 60 into the interior of the can structure 12 to activate the battery cell. Once the electrolyte is inserted, the rivet conduit is sealed with a rubber plug or other appropriate closing means 64 to close the electrolyte-filling path.

The positive voltage potential lead 20 which is attached to the positive electrode of the lithium-ion battery cell during the assembly, is held in a squeezed contacting relationship with the can structure 12 and the cap 50 when the battery pack is assembled. The cap 50 and the can structure 12 therefore are at a positive voltage potential when the battery cell is activated. A positive voltage potential contact pad 74 is made of a bimetal material such as nickel aluminum and the center portion of the outer surface 76 of the pad 74 is gold plated. The pad 74 is held in contact with the cap 50 by means of spot welding along the sides of the pad and provides an electrical and mechanical interface with the positive voltage potential to the battery connector of the device with which the battery pack 10 is used.

The negative voltage potential pad 72 is made of aluminum, steel, nickel or a bimetal material such as nickel aluminum and its choice is dependent on and selected based upon the material of the rivet. The center portion 78 of the pad 72 is gold plated and the pad is welded on the rivet backer 65 by spot welding on the sides of the pad to the surface of the rivet backer 65. The negative voltage potential pad 70 functions to provide an electrical and mechanical interface with the negative voltage potential from the battery cell to the negative potential battery connector of the device with which the battery pack is used. The negative potential pad 70 also maintains the rubber plug 64 in place to prevent electrolyte from leaking from the battery cell through the rivet body as described above.

Figure 6:
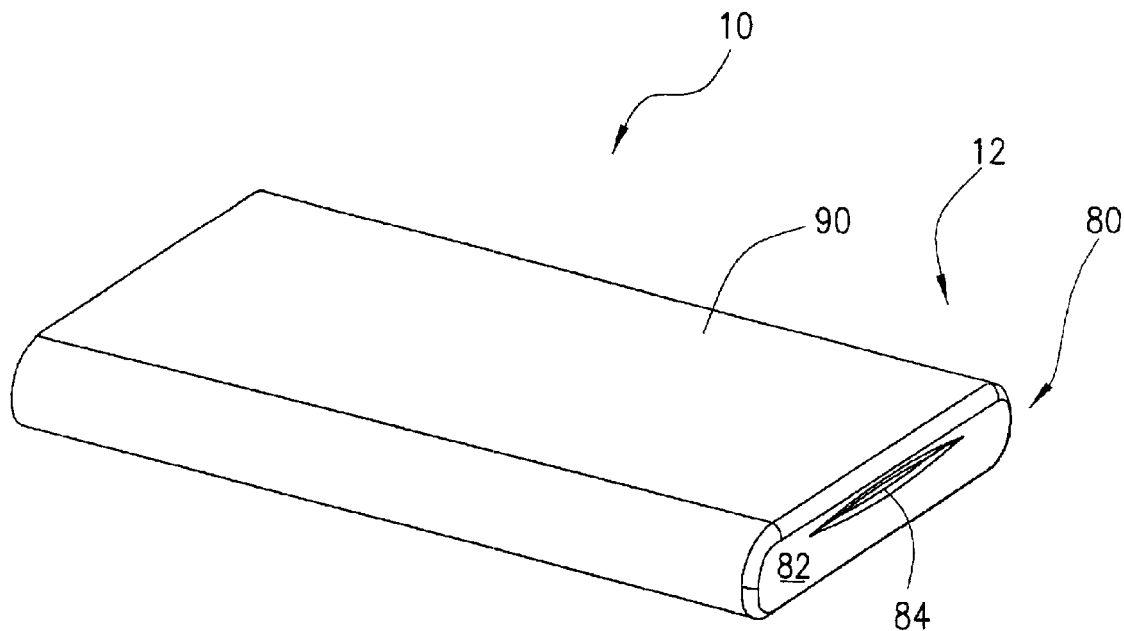
FIG. 6 is an end perspective view of the battery pack of FIGS. 1 and 2 showing the finger groove for use in removing the battery pack from its operative position in the battery system of the mobile cellular telephone with which the battery pack is used.

As shown in FIG. 6, the rewardly facing surface 82 at the end region 80 of the can structure 12 includes a finger groove or slot 84 for use in removing the battery pack 10 from the mobile cellular telephone with which it is used. The groove 84 is preferably tapered inwardly terminating in a very thin weakened wall section. The thichness dimension to create the weakened wall is selected dependent upon the material of the can structure. The weakened wall functions as a safety vent by rupturing to release any built-up pressure within the battery pack due to emission generation from the battery cell contained within to prevent an explosion in the event of such a pressure build-up.

Optionally, the can structure 12 may be isolated and electrically insulated from external circuitry or contact to prevent accidental electrical short circuits since the can structure is at a positive voltage potential when, for example, an aluminum lithium-ion battery cell is used as the battery cell for the battery pack. The can structure 12 preferably is covered with a thin plastic foil, for example, a polyethylene or PET or some other plastic material foil such as illustrated generally by the reference numeral 90 and which foil is slid over the exterior of the can structure 12 such as illustrated in FIGS. 1 and 6 to provide the desired electrical insulation. Additionally, the can structure 12 may be painted, anodized, lacquered or otherwise coated with an insulating cover to provide the desired electrical insulation.

Figure 7:
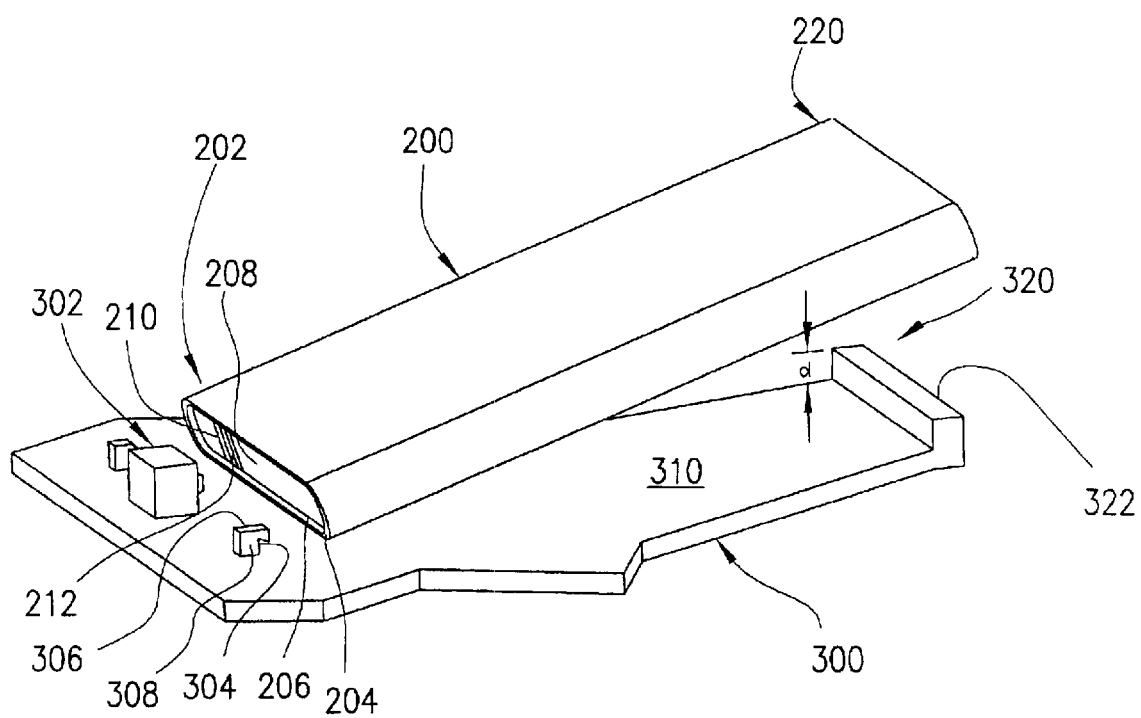
FIG. 7 is a schematic view of one embodiment of the battery system of the present invention showing the battery pack and a partial fragmentary view of the engagement and holding arrangement for the battery pack.
Figure 8:
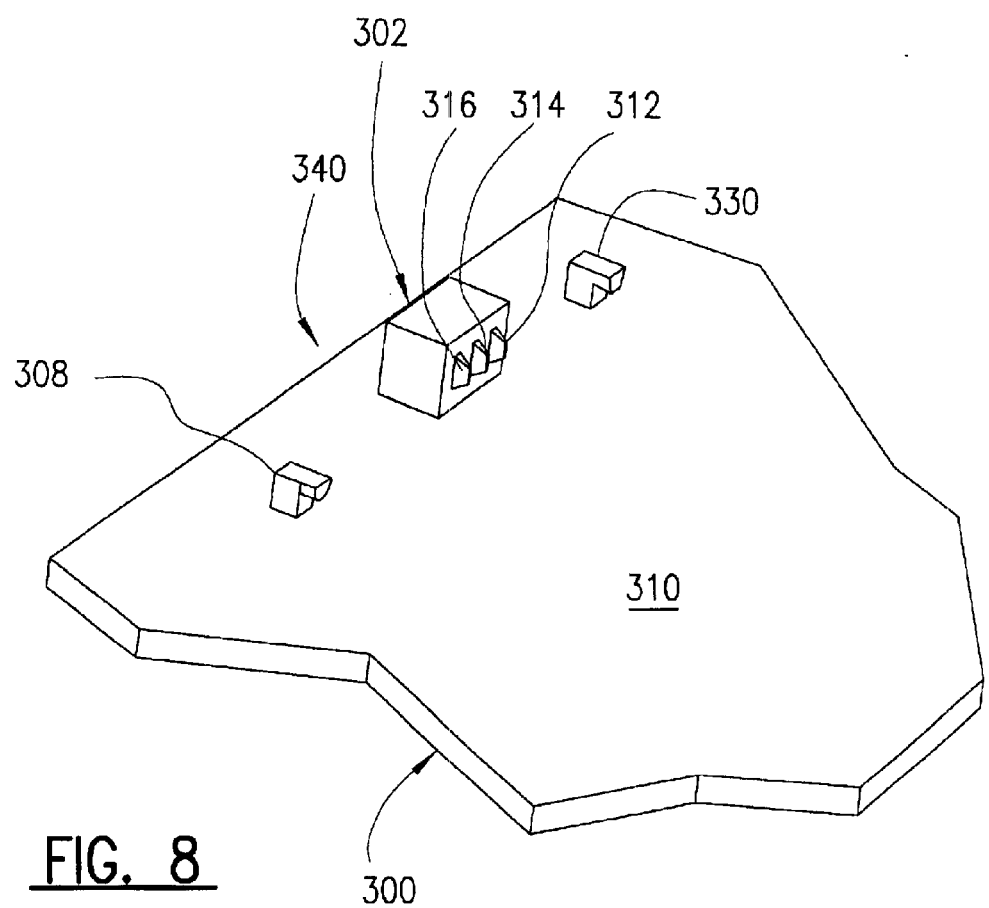
FIG. 8 is a partial fragmentary schematic view of the engagement and holding arrangement for the battery pack illustrated in FIG. 7 showing the connector assembly and the battery flange engaging and retaining gripping posts.
Figure 9:
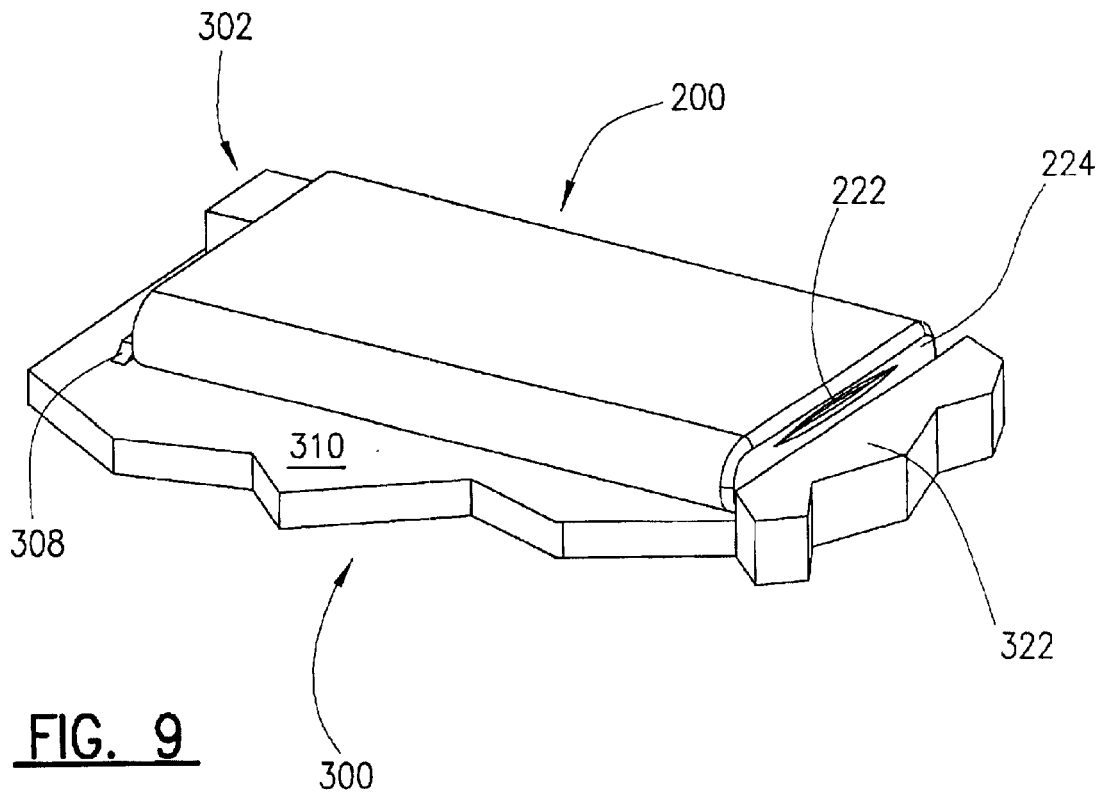
FIG. 9 is a partial fragmentary schematic view of the battery system embodying the present invention showing the battery pack in its operative position in the mobile cellular telephone with which the battery pack is used.

Turning now to FIGS. 7 through 11, the battery system and battery pack embodying the present invention is shown as it may be used with an electrical device such as a mobile cellular telephone. As illustrated in FIG. 7, the battery pack, generally designated 200, has at its connection end 202, a cap 204 similar to the cap 50 described above and includes an outer peripheral flange 206 defining a recessed region generally designated 208. The recessed region 208 of the end cap 204 includes the positive and negative voltage potential connection interface contacts 210, 212, respectively. The contacts 210, 212 are located for connection with corresponding power connection contacts, generally designated 302, of the mobile cellular telephone engagement and holding arrangement, generally designated 300, when the battery pack 200 is inserted in its operative position. The flange portion 206 of the end cap 204 is dimensioned to fit within the space 304 provided between a retaining tab portion 306 of the retainer stud 308 mounted on and extending from the surface 310 of the engagement and holding arrangement 300. When the battery pack 200 is inserted in its operative position, the tab 306 extends into the recessed region 208 to prevent the end region 202 of the battery pack 200 from lifting as the flange 206 is restrained from movement away from the surface 310. The engagement and holding arrangement 300 preferably is an integral part of the cellular telephone case itself and contains an end portion 320 oppositely disposed from the power connection end to receive and prevent the end region 220 of the battery pack 200 from longitudinal movement when the battery pack is in its operative position as illustrated in FIG. 9. The end portion 320 includes an upwardly extending stop or cheek portion 322 extending from the surface 310 a distance "d" sufficient to engage the end 220 of the battery pack 200 to prevent longitudinal movement of the battery pack but only high enough to leave the finger groove 222 in the end region 224 of the battery pack 200 accessible as illustrated in FIG. 9.

As illustrated in FIG. 8, the engagement end portion 340 includes a retaining stud 330 spaced apart and oppositely disposed of the retaining stud 308 for engagement with the flange 206 of the battery pack 200 when the battery pack is in its operative position. The contact supporting block 302 is positioned to provide the necessary mechanical and electrical contact with the voltage potential terminals of the battery pack when the battery pack is in its operative position. The terminals are designated generally 312, 314 in FIG. 8 and are electrically connected respectively to the proper voltage potential and/or ground reference voltage potential supply leads of the cellular mobile telephone with which the battery pack is utilized. Optionally, the terminal carrying block 302 may include additional connection terminals 316 to accommodate a sensing and/or control contact associated with the battery cell voltage and current monitoring and control features.

Figure 10:
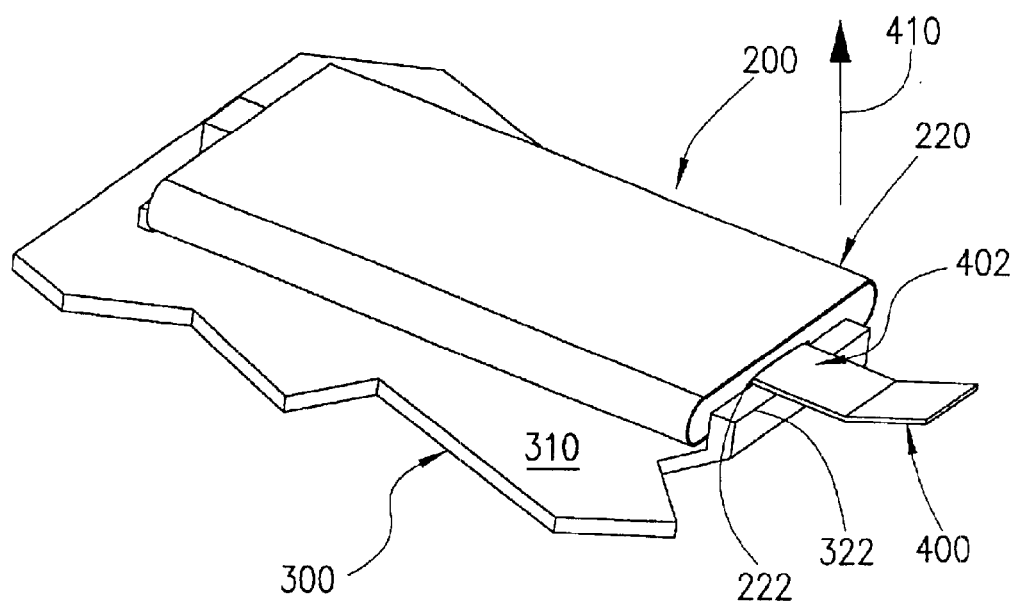
FIG. 10 shows a representative battery pack removal tool engaged within the finger groove as it might be used to release the battery pack from its operative position in the mobile cellular telephone.
Figure 11:
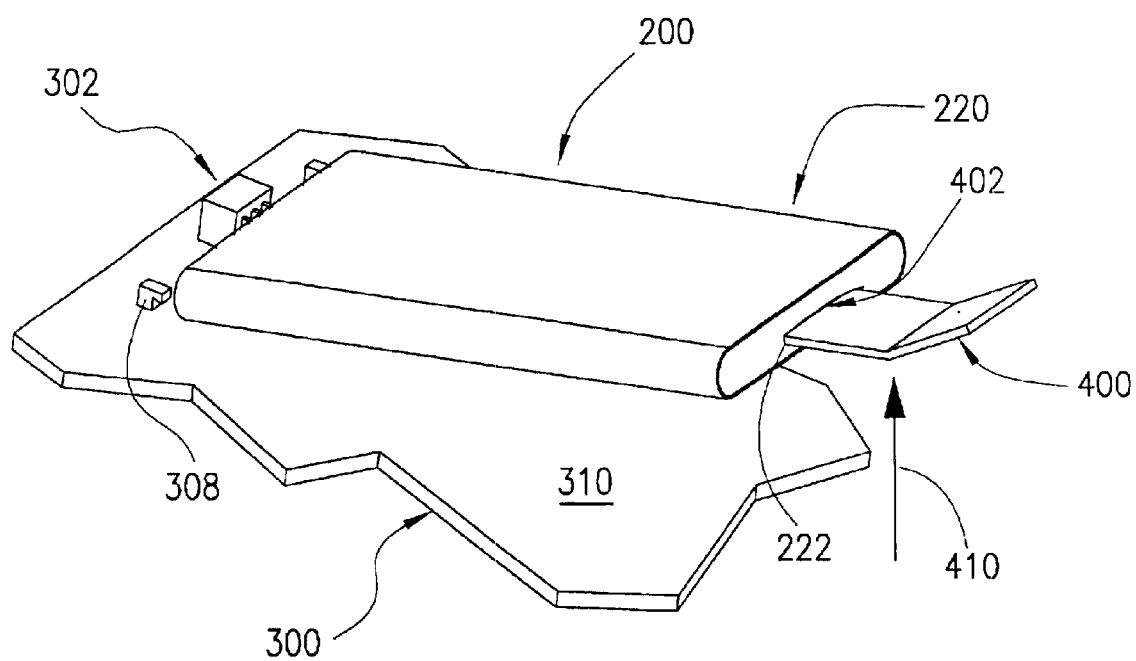
FIG. 11 shows the battery pack partially lifted from its operative position.

It is intended that the battery pack be removed from the mobile cellular telephone without the use or necessity of any tools by simply inserting the tip of the finger or fingernail into the groove 84 and lifting the end of the battery pack away from its operative position. Optionally, as illustrated in FIG. 10, a battery removal tool generally designated 400 may be used to remove the battery pack from its operative position. The battery removal tool 400 includes a tapered portion at one end 402 for insertion into and engagement with the finger groove 222 of the battery pack 200. The battery removal tool 400 lifts the end portion 220 of the battery pack 200 in a direction indicated by the arrow 410 away from the surface 310 of the engagement and holding arrangement 300 forming a part of the mobile cellular telephone. FIG. 11 shows the battery pack partially removed from its operative position.

A battery system for use in a portable electronic device such as a mobile cellular telephone has been described above in several preferred embodiments by way of example. Numerous changes and modifications may be made by those skilled in the art without departing from the spirit and scope of the invention and therefore the invention has been described by way of illustration rather than limitation.

What is claimed is:

1. Battery system for a portable electronic device comprising:
   a battery package comprising a shallow profile, axially elongated thin wall can structure having a width, height and shape defining said shallow profile corresponding generally to the width and height of the battery package receiving and holding region of the electronic device, said battery package further having an axially length distance corresponding to the length of the battery package receiving and holding region of the electronic device;
   said can structure having an opening at one end for receiving and holding anode and cathode material and electrolyte defining a battery cell;
   a safety component electrically coupled between one of the anode or cathode material and a first voltage potential output contact means;
   a second voltage potential output contact means electrically coupled to the other of the anode and cathode material;
   insulating means for carrying said safety component and having a size and shape corresponding to said opening of said can structure to cover said opening;
   a cap having an outer peripheral surface size and shape corresponding to the size and shape of said can structure at said one end and coextensive with the outer surface of said can structure for sealing said opening;
   said cap having an outwardly extending peripheral flange region for engagement with holding means located at one end portion of the battery package receiving and holding region of the electronic device when the battery package is in its operative position within the device; and
   means comprising a finger groove formed in the outer wall of the can structure at the end opposite said opening for releasing the battery package from its operative position within the device wherein said finger groove is exposed and accessible by a user when the battery package is in its operative position within the device.

2. The battery system as defined in claim 1, wherein said insulating means further comprises a first insulating plate and a second insulating plate in a facing relationship with one another to sandwich said safety component therebetween.

3. The battery system as defined in claim 2, further comprising means for attaching and holding said cap to said first insulating plate.

4. The battery system as defined in claim 3, wherein said attaching means further comprises a rivet having a head and body wherein said body passes through one end of said safety component, through said first insulating plate and through said cap to hold said safety component, first insulating plate and said cap together.

5. The battery system as defined in claim 4, wherein said rivet body and head are hollow defining a conduit between the end located at said cap and the head located adjacent said second insulating plate, said second insulating plate having an aperture therethrough and in alignment with and communication with said rivet head for carrying electrolyte from said rivet end through said rivet body and said rivet head into the interior of said can structure and into contact with said anode and cathode material to activate said battery cell.

6. The battery system as defined in claim 5, further including means for sealing said rivet body end to prevent electrolyte from escaping from said battery package.

7. The battery system as defined in claim 1, further comprising an electrically non-conductive coating applied to the exterior surface of said battery package.

8. The battery system as defined in claim 7, wherein said non-conductive coating further comprises a sleeve for covering the surface of said battery package.

9. The battery system as defined in claim 1, wherein the wall thickness of said finger groove is selected to rupture upon pressure build-up inside said battery package to prevent said battery package from exploding.

10. Battery system for a portable electronic device comprising:
    a battery package comprising a shallow profile, axially elongated thin wall can structure having a width, height and shape defining said shallow profile corresponding generally to the width and height of the battery package receiving and holding region of the electronic device, said battery package further having an axially length distance corresponding to the length of the battery package receiving and holding region of the electronic device;

said can structure having an opening at one end for receiving and holding anode and cathode material and electrolyte defining a battery cell;

a safety component electrically coupled between one of the anode or cathode material and a first voltage potential output contact means;

a second potential output contact means electrically coupled to the other of the anode and cathode material;

insulating means for carrying said safety component and having a size and shape corresponding to said opening of said can structure to cover said opening wherein said insulating means further comprises a first insulating plate and a second insulating plate in a facing relationship with one another to sandwich said safety component therebetween;

a cap having an outer peripheral surface size and shape corresponding to the size and shape of said can structure at said one end and coextensive with the outer surface of said can structure for sealing said opening;

said cap having an outwardly extending flange region for engagement with holding means located at one end portion of the battery package receiving and holding region of the electronic device when the battery package is in its operative position within the device;

means for attaching and holding said cap to said first insulating plate wherein said attaching means further comprises a rivet having a head and body wherein said body passes through one end of said safety component, through said first insulating plate and through said cap to hold said safety component, first insulating plate and said cap together; and means formed in the outer wall of the can structure at the end opposite said opening for releasing the battery package from its operative position within the device.

11. The battery system as defined in claim 10, wherein said rivet body and head are hollow defining a conduit between the end located at said cap and the head located adjacent said second insulating plate, said second insulating plate having an aperture therethrough and in alignment with and communication with said rivet head for carrying electrolyte from said rivet end through said rivet body and said rivet head into the interior of said can structure and into contact with said anode and cathode material to activate said battery cell.

12. The battery system as defined in claim 11, further including means for sealing said rivet body end to prevent electrolyte from escaping from said battery package.

13. The battery system as defined in claim 10, further comprising an electrically non-conductive coating applied to the exterior surface of said battery package.

14. The battery system as defined in claim 13, wherein said non-conductive coating further comprises a sleeve for covering the surface of said battery package.

15. The battery system as defined in claim 10, wherein said releasing means further comprises a finger groove in the outer surface of said end wall.

16. The battery system as defined in claim 15, wherein the wall thickness of said finger groove is selected to rupture upon pressure build-up inside said battery package to prevent said battery package from exploding.

17. Battery system for a portable electronic device comprising:

a battery package comprising a shallow profile, axially elongated thin wall can structure having a width, height and shape defining said shallow profile corresponding generally to the width and height of the battery package receiving and holding region of the electronic device, said battery package further having an axially length distance corresponding to the length of the battery package receiving and holding region of the electronic device;

said can structure having an opening at one end for receiving and holding anode and cathode material and electrolyte defining a battery cell;

a safety component electrically coupled between one of the anode or cathode material and a first voltage potential output contact means;

a second voltage potential output contact means electrically coupled to the other of the anode and cathode material;

insulating means for carrying said safety component and having a size and shape corresponding to said opening of said can structure to cover said opening;

a cap having an outer peripheral surface size and shape corresponding to the size and shape of said can structure at said one end and coextensive with the outer surface of said can structure for sealing said opening;

said cap having an outwardly extending flange region for engagement with holding means located at one end portion of the battery package receiving and holding region of the electronic device when the battery package is in its operative position within the device; and means formed in the outer wall of the can structure at the end opposite said opening for releasing the battery package from its operative position within the device wherein said releasing means further comprises a finger groove in the outer surface of said end wall and wherein the wall thickness of said finger groove is selected to rupture upon pressure build-up inside said battery package to prevent said battery package from exploding.

* * * * *